US009957955B2

(12) United States Patent
Kim et al.

(10) Patent No.: US 9,957,955 B2
(45) Date of Patent: May 1, 2018

(54) HIGH EFFICIENCY OCEAN THERMAL DIFFERENCE POWER GENERATING SYSTEM USING LIQUID-VAPOR EJECTOR AND MOTIVE PUMP

(71) Applicant: KOREA INSTITUTE OF OCEAN SCIENCE & TECHNOLOGY, Gyeonggi-do (KR)

(72) Inventors: Hyeon-Ju Kim, Gangwon-do (KR); Ho-Saeng Lee, Gangwon-do (KR); Sang-Won Cha, Gangwon-do (KR); Young-Kwon Jung, Gangwon-do (KR); Jung-In Yoon, Busan (KR); Chang-Hyo Son, Busan (KR); Seong-Hun Seol, Busan (KR); Byeong-Hyo Ye, Busan (KR)

(73) Assignee: Korea Institute of Ocean Science & Technology, Ansan-si, Gyeonggi-do (KR)

( * ) Notice: Subject to any disclaimer, the term of this patent is extended or adjusted under 35 U.S.C. 154(b) by 321 days.

(21) Appl. No.: 14/895,280

(22) PCT Filed: Mar. 5, 2015

(86) PCT No.: PCT/KR2015/002112
§ 371 (c)(1),
(2) Date: Dec. 2, 2015

(87) PCT Pub. No.: WO2016/098949
PCT Pub. Date: Jun. 23, 2016

(65) Prior Publication Data
US 2016/0341184 A1 Nov. 24, 2016

(30) Foreign Application Priority Data
Dec. 17, 2014 (KR) .................. 10-2014-0182509

(51) Int. Cl.
*F03G 7/05* (2006.01)
*F01K 7/16* (2006.01)
*F01K 5/00* (2006.01)

(52) U.S. Cl.
CPC .................. *F03G 7/05* (2013.01); *F01K 5/00* (2013.01); *F01K 7/16* (2013.01); *Y02E 10/34* (2013.01)

(58) Field of Classification Search
CPC ..... F03G 7/05; F03G 7/04; F01K 7/16; Y02E 10/34; Y02E 10/46
(Continued)

(56) References Cited

U.S. PATENT DOCUMENTS 7,827,792 B2 * 11/2010 Brown, Jr. ................ F01K 9/02
60/653
2011/0289961 A1 * 12/2011 Occhipinti ................ F25B 1/06
62/500

FOREIGN PATENT DOCUMENTS

JP  2013-036456 A   2/2013
JP  2013036456 A *  2/2013
(Continued)

*Primary Examiner* — Patrick Maines
(74) *Attorney, Agent, or Firm* — Rabin & Berdo, P.C.

(57) ABSTRACT

There is provided a high efficiency ocean thermal difference power generating system by using liquid-vapor ejector and motive pump comprising: an evaporator for changing transferred refrigerant liquid into refrigerant vapor with high temperature and high pressure by the thermal exchange with surface seawater; a vapor-liquid divider which is installed at the outlet part of the evaporator and divides the refrigerants to liquid-state refrigerant and vapor-state refrigerant respectively; a distributor which is installed at the inlet of the evaporator and distributes the refrigerants flowed into the evaporator to multi-paths; a turbine for generating electric power by using the high pressure refrigerant vapor transferred from the liquid-vapor divider or the evaporator; a (Continued)

motive pump for increasing the pressure of the refrigerant liquid distributed from the distributor or the liquid-vapor divider; a liquid-vapor ejector for mixing the low pressure refrigerant vapor which passed the turbine and the high pressure refrigerant liquid which passed a motive pump, thereby proceeding expansion and compression; a condenser for condensing the refrigerants which was mixed in the liquid-vapor ejector by the thermal exchange with deep seawater; and a refrigerant circulation pump for increasing the pressure of the refrigerants which was condensed in the condenser up to the evaporation pressure and for circulating.

7 Claims, 4 Drawing Sheets

(58) Field of Classification Search
USPC .................................................... 60/641.7
See application file for complete search history.

(56) References Cited

FOREIGN PATENT DOCUMENTS

| | | |
|---|---|---|
| KR | 10-2011-0061844 A | 6/2011 |
| KR | 10-2011-0101754 A | 9/2011 |
| KR | 10-1431133 B1 | 8/2014 |
| KR | 101431133 B1 * | 8/2014 |

* cited by examiner

HIGH EFFICIENCY OCEAN THERMAL DIFFERENCE POWER GENERATING SYSTEM USING LIQUID-VAPOR EJECTOR AND MOTIVE PUMP

TECHNICAL FIELD

The present invention relates to an ocean thermal difference power generating system for further increasing the efficiency of its system cycle by installing a motive pump to a motive part of a liquid-vapor ejector thereby to provide the effect of increasing its power generating efficiency compared with the existing ocean thermal difference power generating systems and for further increasing generated power energy by providing a lower turbine output pressure than that of the existing ocean thermal difference power generating system with the turbine outlet being connected to an inlet part of the ejector, and additionally, for increasing the pressure of the liquid-state working fluid going into the motive part of the ejector by a pump, thereby to provide increased power amount with the greater pressure difference between the inlet and outlet parts of the turbine and increased system efficiency, and more particularly, a high efficiency ocean thermal difference power generating system for making the heat exchanger down-sized by increasing the work done of the turbine owing to the decrease in the amount of working fluid and the decrease in evaporation heat amount in comparison with those required in other power generation systems producing the same amount of generated power energy, thereby to contribute to the high efficiency of the system and provide more economical power generation.

BACKGROUND ART

An ocean thermal difference power generation is the system for generating power by achieving evaporation heat from relatively high temperature warm surface seawater and by using condense heat from relatively low temperature cool deep seawater. Required are there deep seawater and surface seawater in specific temperatures which are continuously supplied in large amount in order to ensure sustainable and stable operation of the ocean thermal difference power generation system and to provide its economical power generation yield. In relation with this, the seawater in the Dong-Hae of the Korean peninsular at the temperature of or below 2° C. is suitable enough being supplied and used as the deep seawater for cooling water in the ocean thermal difference power generation system. However, it is quite difficult to satisfy the condition for the surface seawater being used in the ocean thermal difference power generation system during all seasons around, because the temperature of the surface seawater around the Korean peninsula is up to or higher than 25° C. during summer season only because of the climate feature of the Korean peninsula. Hundreds of thousands of tons amount of high temperature water are found everyday around the seashores of the Korean peninsula though, because a number of thermal power generation plants and nuclear power generation plants are located near the seashores of the Korean peninsula. As such, the large amount of water at the temperature around 25-35° C. discharged out everyday from the thermal power generation plants and nuclear power generation plants is definitely good source being for the ocean thermal conversion power generation system by ocean thermal temperature difference with ambient seawaters as resources thereby to enable overcome the limitation of our climate characteristics. However, there still exist problems to realize the ocean thermal difference power generation system because the temperature difference between the surface seawater as high heat source and the deep seawater as low heat source is still around 25° C. which does not meet the condition and the expected power efficiency for the power generation systems compared with other kinds of power generation systems, and further, its commercialized step is still composed of first and simple cycle operation and requires more efficient power generation system and its development efforts.

DISCLOSURE

Technical Problem

Therefore, the present invention has been made to solve the above problems, and it is an aspect of the present invention to provide a high efficiency ocean thermal difference power generating system using liquid-vapor ejector and motive pump for reducing the evaporation heat energy in an evaporator by distributing working fluid before it is flowed into the evaporator through a refrigerant circulation pump, and making a large amount of the working fluid flowed into the motive part of the ejector.

Another aspect of the present invention is to provide a high efficiency ocean thermal difference power generating system using liquid-vapor ejector and motive pump for increasing generated power amount and enhancing the system efficiency by the system structure in which a pump is installed in a motive part of an ejector so as to increase the pressure of the working fluid and decrease the pressure in the inlet part, thereby increase the pressure difference between the inlet and outlet parts of the turbine.

Other objects and advantages of the invention will become apparent from embodiments of the invention to be described later. The objects and advantages of the invention can be embodied by means described in the appended claims and combinations thereof.

Technical Solution

In accordance with the present invention, the above and other aspects can be accomplished by providing a high efficiency ocean thermal difference power generating system using liquid-vapor ejector and motive pump comprising: an evaporator for changing transferred refrigerant liquid into refrigerant vapor with high temperature and high pressure by the thermal exchange with surface seawater; a vapor-liquid divider which is installed at the outlet of the evaporator and divides the refrigerants to liquid-state refrigerant and vapor-state refrigerant respectively; a distributor which is installed at the inlet of the evaporator and distributes the refrigerants flowed into the evaporator to multi-paths; a turbine for generating electric power by using the high pressure refrigerant vapor transferred from the liquid-vapor divider or the evaporator; a motive pump for increasing the pressure of the refrigerant liquid distributed from the distributor or the liquid-vapor divider; a liquid-vapor ejector for mixing the low pressure refrigerant vapor which passed the turbine and the high pressure refrigerant liquid which passed a motive pump, thereby proceeding expansion and compression; a condenser for condensing the refrigerants which was mixed in the liquid-vapor ejector by the thermal exchange with deep seawater; and a refrigerant circulation pump for increasing the pressure of the refrigerants which was condensed in the condenser up to the evaporation pressure and for circulating.

Advantageous Effects

As described above, in accordance with the present invention, a high efficiency thermal difference power generating system using a distributor, a liquid-vapor divider, a liquid-vapor ejector, and a motive pump is provided for increasing the system efficiency and decreasing the size of the evaporator by controlling the quantity of wet vapor at the outlet part of the evaporator with the installation of the liquid-vapor divider so as to ensure the refrigerants to be used as working fluid at the ejector and reduce the evaporation heat amount.

Further, the evaporation amount of the refrigerant required at the evaporator can be decreased by using the distributor, which functions to distribute a large amount of the refrigerant flowed into the evaporator in order to be used for the working fluid of the liquid-vapor ejector.

Further, the pressure of the refrigerant flowed into the motive part of the liquid-vapor ejector is increased through the motive pump, so as to decrease the pressure at the inlet part of the liquid-vapor ejector, that is, the pressure at the outlet part of the turbine, thereby increase the pressure difference between the inlet and outlet parts of the turbine. Therefore, turbine generating power is increased and the decreased evaporation heat energy contributes to increase the system efficiency.

DESCRIPTION OF DRAWINGS

These and other aspects and advantages of the present invention will become apparent and more readily appreciated from the following description of the embodiments, taken in conjunction with the accompanying drawings, in which.

Figure 1:
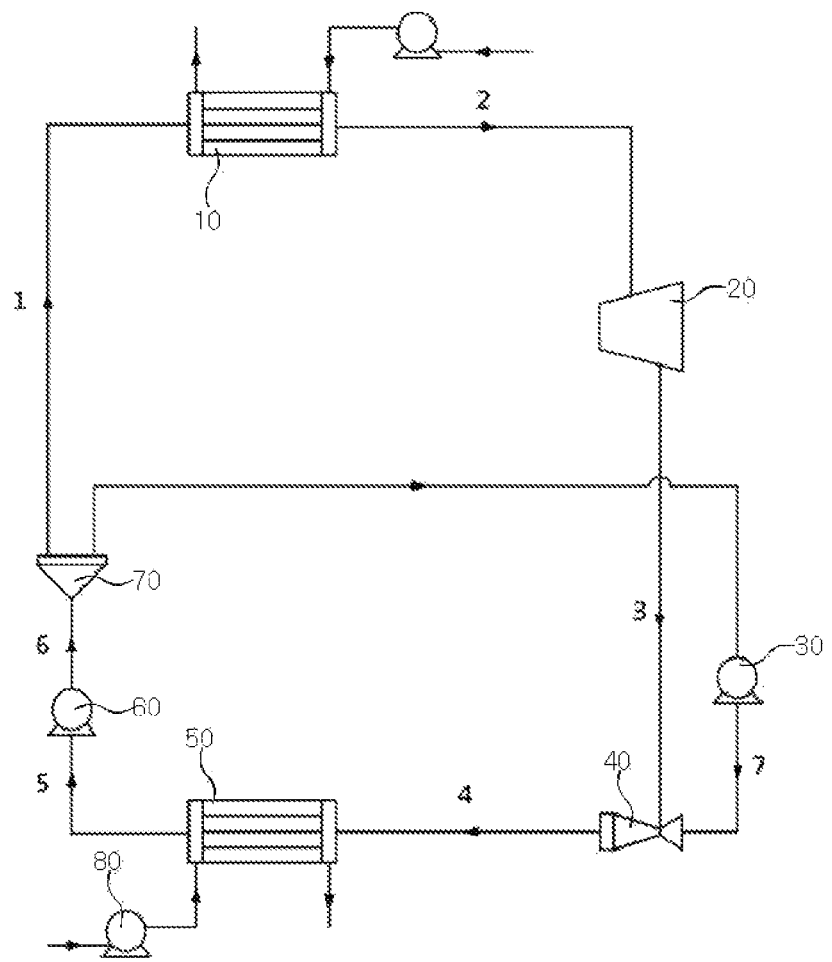
FIG. 1 is a diagram showing a high efficiency ocean thermal difference power generating system using a distributor, a motive pump and a liquid-vapor ejector according to one embodiment of the present invention.

[Brief description of reference numbers of major elements]

| | |
|---|---|
| 10: evaporator | 20: turbine |
| 30: motive pump | 40: liquid-vapor ejector |
| 31: low-level motive pump | 41: low-level liquid-vapor ejector |
| 32: high-level motive pump | 42: high-level liquid-vapor ejector |
| 50: condenser | 60: refrigerant circulation pump |
| 70: distributor | 100: liquid-vapor divider |

BEST MODE

The present invention to achieve the above aspects has the characteristics as follows:

In accordance with an embodiment of the present invention, there is provided a high efficiency ocean thermal difference power generating system using liquid-vapor ejector and motive pump comprising: an evaporator 10 for changing transferred refrigerant liquid into refrigerant vapor with high temperature and high pressure by the thermal exchange with surface seawater; a turbine 20 for generating electric power by using the high pressure refrigerant vapor transferred from the evaporator 10; a liquid-vapor ejector 40 for mixing the low pressure refrigerant vapor which passed the turbine 20 and the high pressure refrigerant liquid which passed a motive pump 30, thereby proceeding expansion and compression; a condenser 50 for condensing the refrigerants which was mixed in the liquid-vapor ejector 40 by the thermal exchange with deep seawater; a refrigerant circulation pump 60 for increasing the pressure of the refrigerants which was condensed in the condenser 50 up to the evaporation pressure and for circulating; and a distributor 70 for distributing the refrigerants which was compressed in the refrigerant circulation pump 60 to the evaporator 10 and the motive pump 30.

Mode For Invention

The present invention will now be described more fully hereinafter with reference to the accompanying drawings, in which preferred embodiments of the invention are shown.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

As used herein, the singular forms "a", "an" and "the" are intended to include the plural forms as well, unless the context clearly indicates otherwise.

Terms indicating directions of apparatuses or elements (such as "front", "back", "up", "down", "top", "bottom", "left", "right", and "lateral") are used to simplify description of the invention and do not represent nor mean that the apparatuses or elements have specific directions. Terms such as "first" and "second" used in this specification or the appended claims are not intended to represent or mean the relative importance or meaning.

The present invention may be embodied in different forms and should not be construed as limited to the embodiments set forth herein. Rather, these embodiments are provided as teaching examples of the invention. Therefore, it will be understood that the scope of the invention is intended to include various modifications and alternative arrangements within the capabilities of persons skilled in the art using presently known or future technologies and equivalents.

Hereinafter, referring to FIGS. 1 and 2, a high efficiency ocean thermal difference power generating system according to one embodiment of the present invention will be described.

Figure 2:
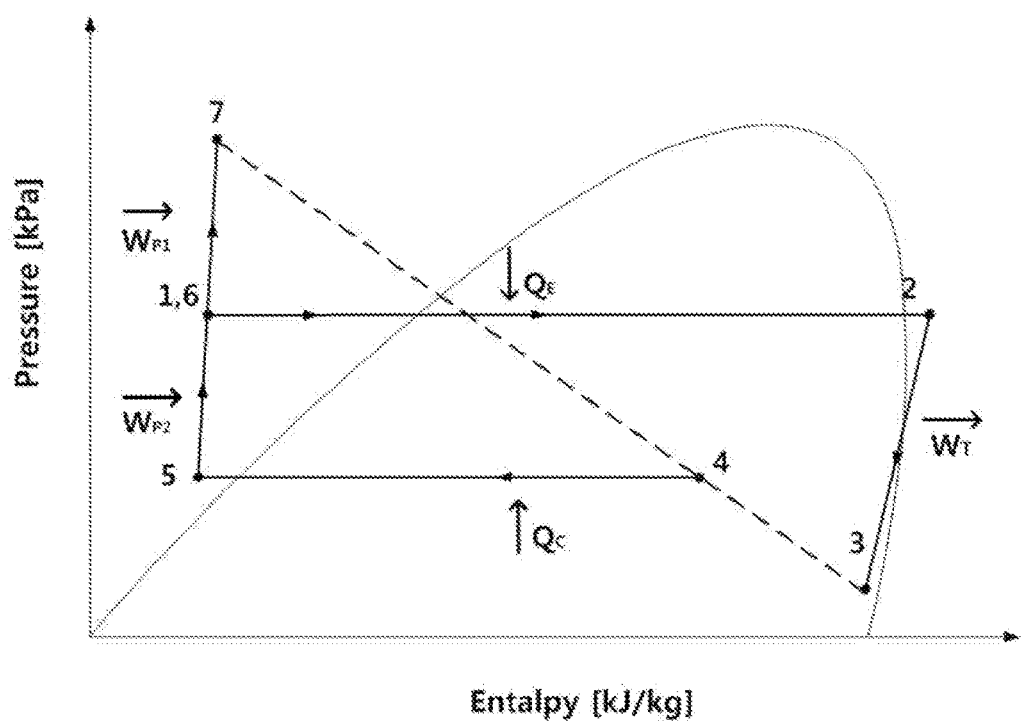
FIG. 2 is a graph showing P-h linear diagram of a high efficiency ocean thermal difference power generating system using a distributor, a motive pump and a liquid-vapor ejector according to one embodiment of the present invention.

FIG. 1 is a diagram showing a high efficiency ocean thermal difference power generating system using a distributor, a motive pump and a liquid-vapor ejector according to one embodiment of the present invention, and FIG. 2 is a graph showing P-h linear diagram of a high efficiency ocean thermal difference power generating system using a distributor, a motive pump and a liquid-vapor ejector according to one embodiment of the present invention.

Referring to FIGS. 1 and 2, the high efficiency ocean thermal difference power generating system according to one embodiment of the present invention comprises an evaporator 10 for changing transferred refrigerant liquid into refrigerant vapor with high temperature and high pressure by the thermal exchange with surface seawater; a distributor 70 which is installed at the inlet of the evaporator 10 and distributes the refrigerants flowed into the evaporator 10 to multi-paths; a turbine 20 for generating electric power by using the high pressure refrigerant vapor transferred from the evaporator 10; a motive pump 30 for increasing the pressure of the low pressure refrigerant liquid distributed from the distributor 70; a liquid-vapor ejector 40 for mixing the low pressure refrigerant vapor which passed the turbine 20 and the high pressure refrigerant liquid which passed a motive pump 30, thereby proceeding expansion and compression; a condenser 50 for condensing the refrigerants which was mixed in the liquid-vapor ejector 40 by the thermal exchange with deep seawater; and a refrigerant circulation pump 60 for increasing the pressure of the refrigerants which was condensed in the condenser 50 up to the evaporation pressure and for circulating.

The distributor 70 distributes a large amount of the refrigerant flowed into the evaporator 10 to multi-paths in order to use the refrigerant as working fluid of the liquid-vapor ejector 40, thereby decrease the evaporation heat energy required at the evaporator 10.

The refrigerant liquid distributed from the distributor 70 is pressurized to a high pressure by the motive pump 30, so as to decrease the pressure at the inlet part of the liquid-vapor ejector 40 and increase the pressure difference between the inlet and outlet parts of the turbine, and thereby increase the power amount generated at the turbine 20.

Therefore, the generated power amount is increased by the decreased evaporation heat energy and by use of the liquid-vapor ejector and the motive pump both, thereby increase the system efficiency of the ocean thermal difference power generation cycle.

Now hereinafter, a high efficiency ocean thermal difference power generating system according to another embodiment of the present invention will be described.

The high efficiency ocean thermal difference power generating system using liquid-vapor ejector and motive pump comprises: an evaporator 10 for changing transferred refrigerant liquid into refrigerant vapor with high temperature and high pressure by the thermal exchange with surface seawater; a turbine 20 for generating electric power by using the high pressure refrigerant vapor transferred from the evaporator 10; a low-level liquid-vapor ejector 41 for mixing the low pressure refrigerant vapor which passed the turbine 20 and the high pressure refrigerant liquid which passed a low-level motive pump 31, thereby proceeding expansion and compression; a vapor-liquid divider 100 for dividing the refrigerants mixed in the low-level liquid-vapor ejector 41 to liquid-state refrigerant and vapor-state refrigerant respectively; a high-level liquid-vapor ejector 42 for inflowing the refrigerant which passed the vapor-liquid divider 100, and the refrigerant which passed a high-level motive pump 32 compressing the liquid-state refrigerant divided from the vapor-liquid divider 100 thereinto; a condenser 50 for condensing the refrigerants mixed in the high-level liquid-vapor ejector 42 by the thermal exchange with deep seawater; a refrigerant circulation pump 60 for increasing the pressure of the refrigerants which was condensed in the condenser 50 up to the evaporation pressure and for circulating; and a distributor 70 for distributing the refrigerants which was compressed in the refrigerant circulation pump 60 to the evaporator 10 and the low-level motive pump 31.

Hereinafter, referring to FIGS. 3 and 4, the high efficiency ocean thermal difference power generating system according to another embodiment of the present invention will be described.

Figure 3:
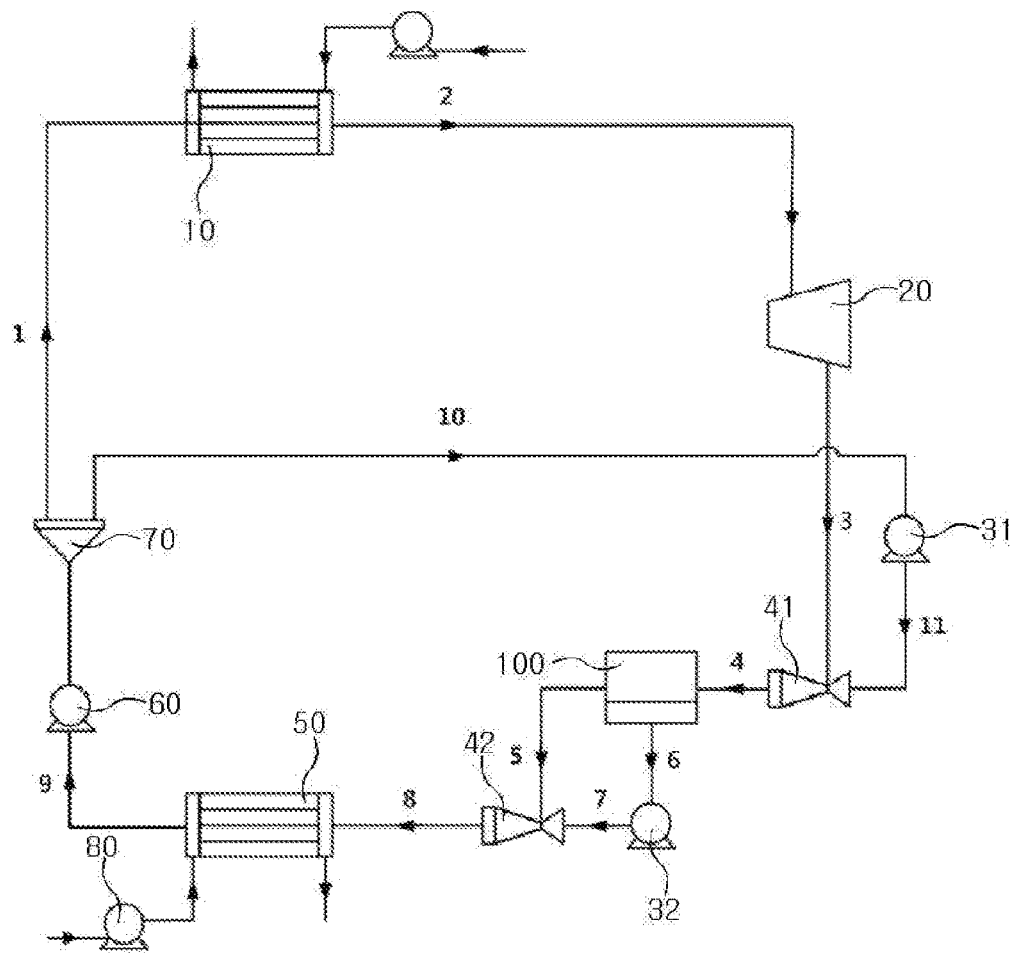
FIG. 3 is a diagram showing a high efficiency ocean thermal difference power generating system using a distributor, a liquid-vapor divider, a motive pump and multi-level liquid-vapor ejectors according to another embodiment of the present invention.
Figure 4:
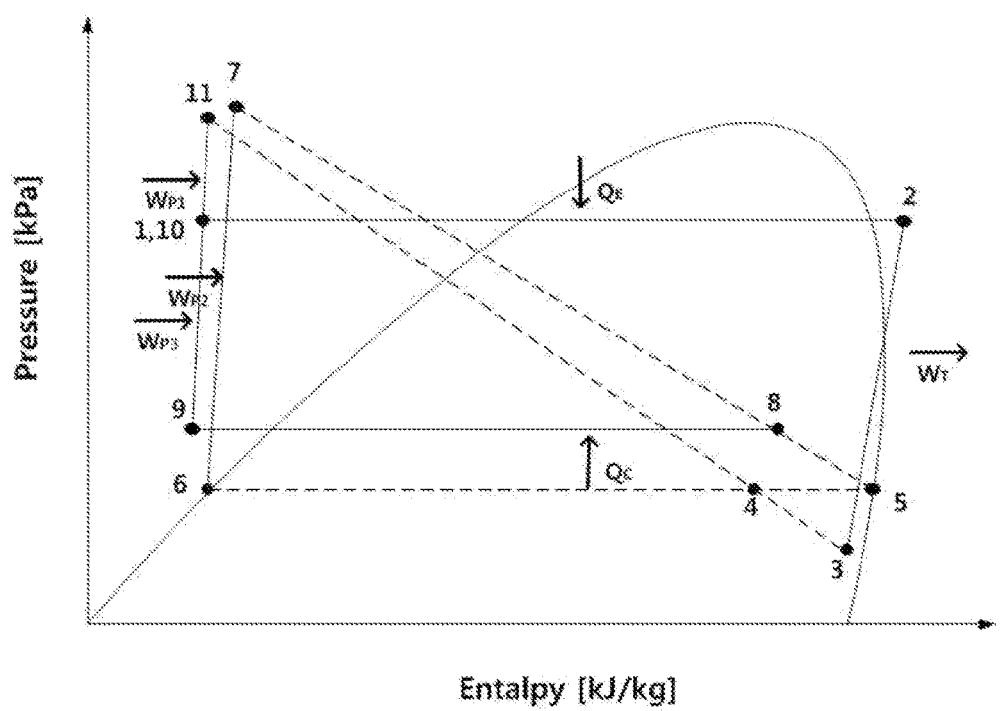
FIG. 4 is a graph showing P-h linear diagram of a high efficiency ocean thermal difference power generating system using a distributor, a liquid-vapor divider, a motive pump and multi-level liquid-vapor ejectors according to another embodiment of the present invention.

FIG. 3 is a diagram showing a high efficiency ocean thermal difference power generating system using a distributor, a liquid-vapor divider, a motive pump and multi-level liquid-vapor ejectors according to another embodiment of the present invention, and FIG. 4 is a graph showing P-h linear diagram of a high efficiency ocean thermal difference power generating system using a distributor, a liquid-vapor divider, a motive pump and multi-level liquid-vapor ejectors according to another embodiment of the present invention.

The high efficiency ocean thermal difference power generating system according to another embodiment of the present invention comprises: an evaporator 10 for changing transferred refrigerant liquid into refrigerant vapor with high temperature and high pressure by the thermal exchange with surface seawater; a distributor 70 which is installed at the inlet of the evaporator 10 and distributes the refrigerants flowed into the evaporator 10 to multi-paths; a turbine 20 for generating electric power by using the high pressure refrigerant vapor transferred from the evaporator 10; a low-level motive pump 31 for increasing the pressure of the refrigerant liquid distributed from the distributor 70; a low-level liquid-vapor ejector 41 for mixing the low pressure refrigerant vapor which passed the turbine 20 and the high pressure refrigerant liquid which passed the low-level motive pump 31, and proceeding expansion and compression; a vapor-liquid divider 100 for dividing the refrigerants mixed in and discharged from the low-level liquid-vapor ejector 41 to liquid-state refrigerant and vapor-state refrigerant respectively; a high-level motive pump 32 for increasing the pressure of the liquid-state refrigerant divided from the vapor-liquid divider 100; a high-level liquid-vapor ejector 42 for proceeding expansion and compression by mixing and using the refrigerant vapor transferred from the liquid-vapor divider 100 as fluid for the inlet, and using high pressure refrigerant liquid compressed at the high-level motive pump 32 as working fluid; a condenser 50 for condensing the refrigerants mixed in the high-level liquid-vapor ejector 42 by the thermal exchange with deep seawater; and a refrigerant circulation pump 60 for increasing the pressure of the refrigerants which was condensed in the condenser 50 up to the evaporation pressure and for circulating.

Herein, the distributor 70 distributes a large amount of the refrigerants to be flowed into the evaporator 10 to multi-paths in order to be used as working fluid of the low-level liquid-vapor ejector 41, so as to reduce the evaporation heat energy required in the evaporator.

The refrigerant liquid distributed from the distributor 70 is pressurized to a high pressure by the low-level motive pump 31, so as to greatly decrease the pressure at the inlet part of the low-level liquid-vapor ejector 41 and increase the pressure difference between the inlet and outlet parts of the turbine, and thereby increase the power amount generated at the turbine 20.

Further, the refrigerant discharged from the high-level liquid-vapor ejector 42 is sent to the condenser 50.

Further, the high-level liquid-vapor ejector 42 is installed so as to decrease the pressure at the outlet part of the low-level liquid-vapor ejector 41 and decrease the pressure at inlet part of the low-level liquid-vapor ejector 41 and the outlet part of the turbine, thereby increase the electric power generated in the turbine.

Therefore, the generated power amount is increased by the decreased evaporation heat energy and by use of the multi-level liquid-vapor ejectors and the motive pump both, thereby increase the system efficiency of the ocean thermal difference power generation cycle.

Further, the first and the second embodiments of the present invention are characterized as follows.

The refrigerant liquid which passed the distributor 70 is transferred to the evaporator 10 through the refrigerant circulation pump, and the distributed refrigerant liquid is used as working liquid for the motive parts of the liquid-vapor ejectors 40, 41.

Further, the first and the second embodiments of the present invention are characterized as follows.

The refrigerant liquid is compressed to high pressure through the motive pumps 30, 31, 32, and flowed into the motive parts of the liquid-vapor ejectors 40, 41, 42.

Further, in the second embodiment of the present invention, a high-level liquid-vapor ejector 42 is additionally installed so as to decrease the pressure at the outlet part of the low-level liquid-vapor ejector 41 and decrease the pressure at inlet part of the low-level liquid-vapor ejector 41 and the outlet part of the turbine, thereby increase the electric power generated in the turbine.

While the invention was described above with reference to the finite embodiments and drawings, the invention is not limited to the embodiments but can be modified and changed in various forms by those skilled in the art without departing from the technical concept of the invention and the equivalents of the appended claims.

What is claimed is:

1. A high efficiency ocean thermal difference power generating system using liquid-vapor ejector and motive pump comprising:
    an evaporator for changing transferred refrigerant liquid into high pressure refrigerant vapor by thermal exchange with surface seawater;
    a turbine for generating electric power by using the high pressure refrigerant vapor transferred from the evaporator;
    a liquid-vapor ejector for mixing low pressure refrigerant vapor which passed the turbine and high pressure refrigerant liquid which passed a motive pump, thereby proceeding expansion and compression;
    a condenser for condensing the refrigerants which were mixed in the liquid-vapor ejector by thermal exchange with deep seawater;
    a refrigerant circulation pump for increasing the pressure of the refrigerants which were condensed in the condenser up to the evaporation pressure and for circulating; and
    a distributor for distributing the refrigerants which were compressed in the refrigerant circulation pump to the evaporator and the motive pump.

2. The high efficiency ocean thermal difference power generating system using liquid-vapor ejector and motive pump according to claim 1, wherein the refrigerant liquid which passed the distributor is transferred to the evaporator through the refrigerant circulation pump, and the distributed refrigerant liquid is used as liquid for the motive parts of the liquid-vapor ejector.

3. The high efficiency ocean thermal difference power generating system using liquid-vapor ejector and motive pump according to claim 1, wherein the refrigerant liquid is compressed to high pressure through the motive pump, and flowed into the motive parts of the liquid-vapor ejector.

4. A high efficiency ocean thermal difference power generating system using liquid-vapor ejectors and motive pumps comprising:
    an evaporator for changing transferred refrigerant liquid into high pressure refrigerant vapor by thermal exchange with surface seawater;
    a turbine for generating electric power by using the high pressure refrigerant vapor transferred from the evaporator;
    a low-level liquid-vapor ejector for mixing low pressure refrigerant vapor which passed the turbine and high pressure refrigerant liquid which passed a low-level motive pump, thereby proceeding expansion and compression;
    a vapor-liquid divider for dividing the refrigerants mixed in the low-level liquid-vapor ejector to liquid-state refrigerant and vapor-state refrigerant respectively;
    a high-level liquid-vapor ejector for flowing the refrigerant which passed the vapor-liquid divider, and the refrigerant which passed a high-level motive pump compressing the liquid-state refrigerant divided from the vapor-liquid divider thereinto;
    a condenser for condensing the refrigerants mixed in the high-level liquid-vapor ejector by the thermal exchange with deep seawater;
    a refrigerant circulation pump for increasing the pressure of the refrigerants which were condensed in the condenser up to the evaporation pressure and for circulating; and
    a distributor for distributing the refrigerants which were compressed in the refrigerant circulation pump to the evaporator and the low-level motive pump.

5. The high efficiency ocean thermal difference power generating system using liquid-vapor ejectors and motive pumps according to claim 4, further comprising a high-level liquid-vapor ejector so as to decrease the pressure at the outlet part of the low-level liquid-vapor ejector and decrease the pressure at inlet part of the low-level liquid-vapor ejector and the outlet part of the turbine, thereby increasing the electric power generated in the turbine.

6. The high efficiency ocean thermal difference power generating system using liquid-vapor ejectors and motive pumps according to claim 4, wherein the refrigerant liquid which passed the distributor is transferred to the evaporator through the refrigerant circulation pump, and the distributed refrigerant liquid is used as liquid for the motive parts of the low-level liquid-vapor ejector and the high-level liquid-vapor ejector.

7. The high efficiency ocean thermal difference power generating system using liquid-vapor ejectors and motive pumps according to claim 4, wherein the refrigerant liquid is compressed to high pressure through the low-level motive pump and the high-level motive pump, and flowed into the motive parts of the low-level liquid-vapor ejector and the high-level liquid-vapor ejector, respectively.

* * * * *